(12) United States Patent
Delaye et al.

(10) Patent No.: US 8,868,287 B2
(45) Date of Patent: Oct. 21, 2014

(54) PREDICTION OF MAINTENANCE OPERATIONS ON AN AIRCRAFT ENGINE

(75) Inventors: Guillaume Delaye, Brie Comte Robert (FR); Jean-Philippe Autier, Grisy-Suisnes (FR); Eric Gendronneau, Hericy (FR)

(73) Assignee: Snecma, Paris (FR)

( * ) Notice: Subject to any disclaimer, the term of this patent is extended or adjusted under 35 U.S.C. 154(b) by 0 days.

(21) Appl. No.: 13/403,272

(22) Filed: Feb. 23, 2012

(65) Prior Publication Data
US 2012/0221193 A1 Aug. 30, 2012

(30) Foreign Application Priority Data
Feb. 25, 2011 (FR) .................... 11 51543

(51) Int. Cl.
| | | |
|---|---|---|
| G01M 17/00 | (2006.01) | |
| G06F 7/00 | (2006.01) | |
| G06F 19/00 | (2011.01) | |
| G05B 23/02 | (2006.01) | |

(52) U.S. Cl.
CPC ........ *G05B 23/0283* (2013.01); *F05D 2260/82* (2013.01); *F05D 2260/80* (2013.01); *F05D 2230/72* (2013.01)
USPC ........ 701/31.9; 701/29.3; 701/32.1; 701/34.1

(58) Field of Classification Search
CPC ............ F05D 2230/72; F05D 2260/80; F05D 2260/82
USPC ........ 701/29, 29.1, 29.4, 30, 31.4, 31.9, 34.4; 705/7
See application file for complete search history.

(56) References Cited

U.S. PATENT DOCUMENTS

| | | | | |
|---|---|---|---|---|
| 6,067,486 | A * | 5/2000 | Aragones et al. ............ | 701/29.6 |
| 6,115,656 | A * | 9/2000 | Sudolsky ..................... | 701/33.4 |
| 6,799,154 | B1 * | 9/2004 | Aragones et al. ............... | 703/22 |
| 6,832,205 | B1 * | 12/2004 | Aragones et al. ............ | 705/7.25 |
| RE39,618 | E * | 5/2007 | Levine ......................... | 701/29.6 |
| 7,860,618 | B2 * | 12/2010 | Brandstetter et al. ........ | 701/29.3 |
| 8,117,007 | B2 * | 2/2012 | Yitbarek et al. ............. | 701/29.4 |
| 8,301,332 | B2 * | 10/2012 | Rawle .......................... | 701/29.3 |
| 8,396,571 | B2 * | 3/2013 | Costiner et al. ................. | 700/28 |
| 2004/0204805 | A1 | 10/2004 | Betters et al. | |
| 2005/0187739 | A1 * | 8/2005 | Baust et al. .................... | 702/184 |
| 2007/0088584 | A1 * | 4/2007 | Aragones et al. ................. | 705/7 |

(Continued)

OTHER PUBLICATIONS

International Search Report issued May 4, 2012, in PCT/FR2012/050338 with English translation of category of cited documents.

*Primary Examiner* — Jason Holloway
*Assistant Examiner* — Rachid Bendidi
(74) *Attorney, Agent, or Firm* — Oblon, Spivak, McClelland, Maier & Neustadt, L.L.P.

(57) ABSTRACT

The invention relates to a method and a system for predicting maintenance operations on a current aircraft engine, comprising:

processing means to compare a set of failure models (M1, . . . , Mn) adapted to said current engine to select a relevant failure model (Mi) with a failure age ($T_0$) defining the age of said engine at the time of the failure;

processing means to associate decision rules (R) about the workscope on said current engine with said relevant failure model (Mi), as a function of a set of parameters (P1, P2, Pi) related to said current engine; and processing means to determine the required maintenance workscope (Wf) to be applied to said current engine, as a function of said decision rules.

11 Claims, 4 Drawing Sheets

(56) References Cited

U.S. PATENT DOCUMENTS

| | | |
|---|---|---|
| 2008/0147264 A1* | 6/2008 | Doulatshahi et al. ........... 701/30 |
| 2008/0172268 A1* | 7/2008 | Wingenter ..................... 705/7 |
| 2008/0234979 A1* | 9/2008 | Costiner et al. ............... 702/184 |
| 2008/0270202 A1* | 10/2008 | Krempel et al. .................. 705/7 |
| 2009/0094076 A1* | 4/2009 | Reddy ............................. 705/7 |
| 2010/0070237 A1 | 3/2010 | Yitbarek et al. |
| 2010/0262442 A1* | 10/2010 | Wingenter ....................... 705/7 |

* cited by examiner

PREDICTION OF MAINTENANCE OPERATIONS ON AN AIRCRAFT ENGINE

FIELD OF THE INVENTION

This invention relates to the domain of maintenance of an aircraft engine. In particular, the invention relates to a method and a system for anticipating or predicting maintenance operations on an aircraft engine.

In general, work is done on the engine directly depending on the cause of the failure, without considering other parameters. For example, if an oil leak is detected, action will be taken on the oil circuit and so on.

However, a maintenance operation on an aircraft engine may require a long downtime and high part and labour costs.

Then, in order to optimise and plan maintenance operations, operating experience on causes of failures accumulated by repair workers in workshops is used to trace statistical failure curves based on Weibull's laws. The tool used at the moment consists of systematically assigning a workscope based on Weibull statistical failure curves.

The fact that the same average workscope is assigned to all causes of failure makes it impossible to take account of the specificities or the history of the engine.

This causes a lack of precision on the prediction of maintenance operations and it can induce incomplete maintenance of the engine that can then fail shortly after it has been taken out from the shop visit.

Consequently, the purpose of this invention is to make a precise prediction of maintenance operations on an aircraft engine without any of the above mentioned disadvantages.

PURPOSE AND SUMMARY OF THE INVENTION

This invention relates to a method of predicting maintenance operations on a current aircraft engine, comprising the following steps:

compare a set of failure models adapted to said current engine to select a relevant failure model with a failure age defining the age of said engine at the time of the failure;

associate decision rules about the workscope on said current engine with said relevant failure model as a function of a set of parameters related to said current engine; and determine the required maintenance workscope to be done on said current engine as a function of said decision rules.

The method thus takes account of the causes of failure and the full expression of their effects to discriminate one engine from another and to associate a technical workscope specific to each engine in a much more detailed manner. This enables a prognostic and planning of maintenance operations with greater precision.

Advantageously, said set of parameters comprises the following parameters: failure age, operating duration of said current engine since the last shop visit, rank of the shop visit, potential remaining life for each of a plurality of life limited parts (LLP) of said current engine and reconstruction constraints of said engine.

According to one embodiment of this invention, said decision rules comprise a first rules module defining a plurality of workscopes relative to operating times of said engine, and in that a relevant workscope is selected among said plurality of workscopes as a function of said failure age associated with said relevant failure model.

Said first rules module is selected among a set of first rules modules defined previously during an initialisation phase, each of said first rules modules being associated with a determined failure model and a determined rank of the shop visit.

Advantageously, said decision rules comprise a second rules module defining relations between the workscopes of said first rules module and maintenance operations, and said required maintenance workscope is determined as a function of said relevant workscope, reconstruction constraints of said engine and the potential remaining life for each of a plurality of life limited parts (LLP) of said current engine.

Advantageously, said set of parameters is modified after the maintenance operation on said current engine has been done.

Said failure models are derived from the analysis of operating experience on a fleet of engines comprising data including the number of engines, operating environment of each engine, model of each engine, operational condition of each engine, the maintenance location of each engine, duration between entry of each engine in the workshop and its exit from the workshop.

The invention also relates to a computer program comprising code instructions for implementation of the prediction method based on the above characteristics when it is run by processing means.

The invention also relates to a system for predicting maintenance operations on a current aircraft engine comprising:

processing means to compare a set of failure models adapted to said current engine to select a relevant failure model with a failure age defining the age of said engine at the time of the failure;

processing means to associate decision rules about the workscope on said current engine with said relevant failure model, as a function of a set of parameters related to said current engine; and processing means to determine the required maintenance workscope to be applied to said current engine, as a function of said decision rules.

BRIEF DESCRIPTION OF THE DRAWINGS

Other features and advantages of the system and method according to the invention will become clearer after reading the following description given for guidance but non-limitative, with reference to the appended drawings in which.

DETAILED DESCRIPTION OF EMBODIMENTS

The principle of the invention consists of making the best use of the failure history of a fleet of engines to predict future maintenance operations very precisely. Thus, the workscope on the engine can be deduced without supervision and in great detail by taking account of the parameters with the greatest influence on the causes of failure.

Figure 1:
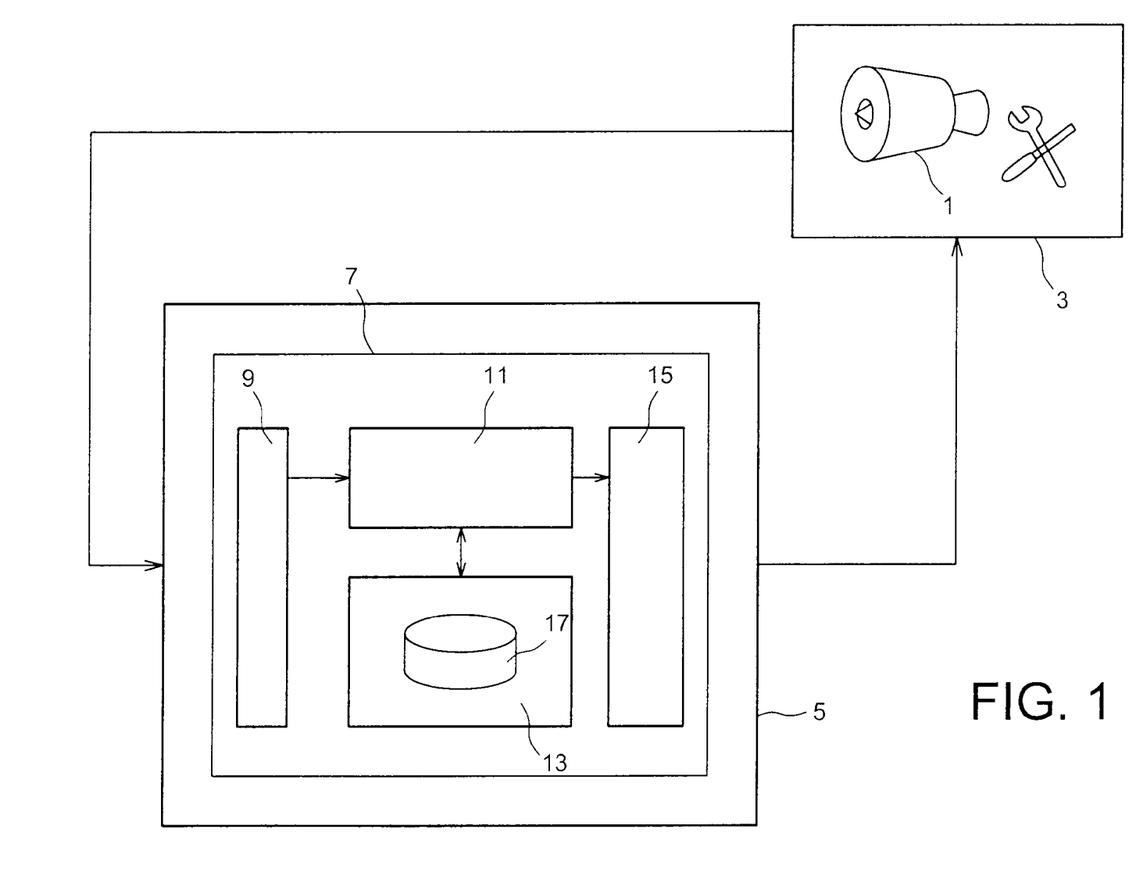
FIG. 1 diagrammatically shows hardware means used in the system or method that can be used for predicting maintenance operations on an aircraft engine according to the invention.

FIG. 1 shows an example of equipment means used in the system or method for predicting maintenance operations on an aircraft engine according to the invention.

During shop visits of engines 1 in workshops 3, repair workers accumulate experience on causes of failures and workscopes. The prediction system 5 uses this operating experience to build failure models so that maintenance operations to be done on aircraft engines can be predicted.

More particularly, the prediction system 5 comprises a computer system 7 usually comprising input means 9, processing means 11, storage means 13 and output means 15. It should be noted that the storage means 13 can comprise a computer program containing code instructions adapted to implement the prediction method according to the invention. This computer program may be run by processing means 11 making use of the storage means 13 and the input means 9 and output means 15.

The various data derived from operating experience from the various workshops 3 are stored in the storage means 13 to create a database 17 on a complete fleet of engines. Other data concerning the engines are also recorded in the database 17 to add information about engines.

The database 17 thus comprises a plurality of measurements and data collected on the engines 1 over time. These data contain different causes of failures and the workscope on each engine, the number of engines processed or to be processed, the operating environment for each engine, the model and identifier of each engine, the operational condition of each engine, the maintenance location of each engine, the duration between the entry of each engine into the shop and its exit, etc.

The method according to the invention can model the behaviour of a complete fleet of engines producing a prediction of the number of engine removals and the workscopes on the different engines as a function of the different input data concerning the fleet recorded in the database 17. This method also manages technical history of the engines taking account of their aging in the determination of removal plans, workscopes and dates of shop visits for the different engines 1 in the workshop 3.

More particularly, the processing means 11 are configured to use the data recorded in the database so as to determine statistical failure models modeling causes of failures as a function of time. More precisely, the processing means 11 associate a set of failure models adapted with each engine model and its use. Each failure model can be expressed in the form of an accumulated failure probability curve as a function of time (see FIGS. 2 and 3 for example).

Advantageously, the failure models may be based on a Weibull law that is very suitable for modeling the life or the failure of a component of the engine 1. The probability density $f(t;\beta,\eta,\gamma)$ of a Weibull distribution may be expressed in the following form:

$$f(t;\beta,\eta,\gamma) = \frac{\beta}{\eta}\left(\frac{t-\gamma}{\eta}\right)^{k-1} e^{-\left(\frac{t-\gamma}{\eta}\right)^{\beta}}$$

This law is extremely flexible because it takes account of three parameters, namely the shape parameter $\beta$, the scale parameter $\eta$, and the positioning parameter $\gamma$.

The distribution function or the probability of failure for the Weibull law is then defined as follows:

$$F(t;\beta,\eta,\gamma) = 1 - e^{-\left(\frac{t-\gamma}{\eta}\right)^{\beta}}$$

Due to the flexibility of this law, the large majority of failure records can be satisfactorily described by a Weibull distribution. This is explained particularly by the fact that it is capable of reproducing the behaviour of other probability laws. For example if $\beta=1$, the Weibull law is equivalent to an exponential distribution; if $\beta=2$, it is equivalent to a Rayleigh distribution; if $3<\beta<4$, it is equivalent to a normal distribution; if $\beta\to\infty$, it is equivalent to a Dirac type distribution. In some other cases, it also reproduces the binomial law and Poisson's law.

Obviously, for a component of the engine 1 with several failure modes over time, the Weibull law may be defined with different parameters as a function of the age of the component. For example, in the beginning, the failure rate of a component may be decreasing ($\beta<1$) representing "infant mortality". In other words, fragile components fail quickly very early causing a reduction in the failure rate after the defective components have been eliminated. The failure rate then remains stationary ($\beta=1$) throughout the useful life of the component. Finally, the failure rate begins to increase ($\beta>1$) during a natural wear phase. The three failure modes then form a continuous bathtub shaped curve.

It should be noted that other statistical laws can be used for components subject to some non-linear phenomena such as cracking. More appropriate log-normal type distributions could be used for this type of phenomenon.

Figure 2:
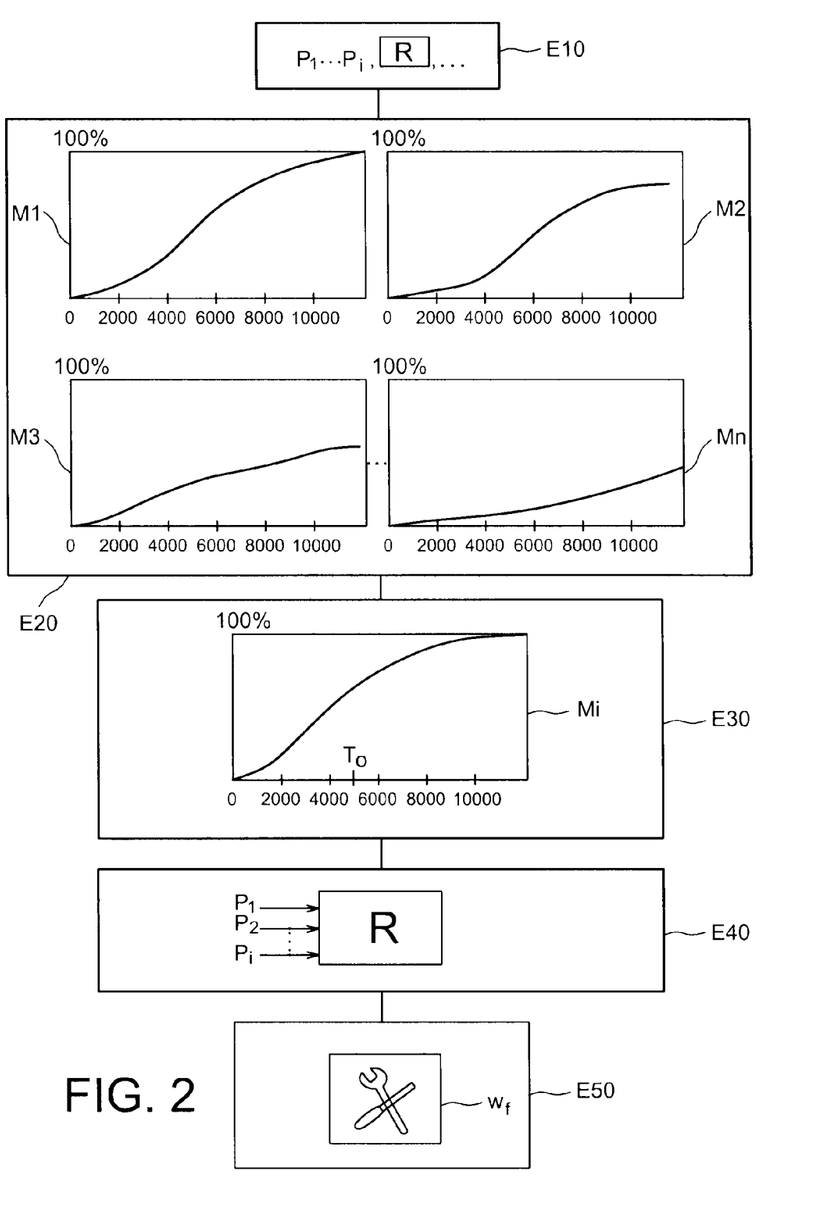
FIG. 2 shows the method for predicting maintenance operations on a given aircraft engine according to the invention.

FIG. 2 shows the method according to the invention for predicting maintenance operations on a given aircraft engine.

Step E10 relates to initialisation of data, parameters and input variables. These inputs comprise the engine model, its operating environment, its operational conditions, failure models adapted to this engine, etc.

The inputs also comprise the parameters P1, P2, ..., Pi with the greatest influence in the link between a probable cause of failure and a workscope, and a set of decision rules R about the workscope on the engine 1.

The set of influential parameters P1, P2, ..., Pi comprises parameters concerning the age of the engine and reconstruction constraints of the engine.

Furthermore, the decision rules R may be logical rules built up as a function of the different failure models and the set of parameters.

In step E20, the processing means 11 can use the set of failure models M1, M2, M3, ..., Mn adapted to the engine 1 under surveillance, from the storage means 13. Each of the failure models is represented by a law for the cumulated probability of failure between 0 and 100% as a function of time expressed for example in hours or as the number of cycles of the engine under the wing. It should be noted that a cycle corresponds to all flight phases (takeoff, flight and landing). These failure models M1, M2, M3, ..., Mn may be displayed on a screen forming part of the output means 15.

In step E30, the processing means 11 are configured to compare all failure models M1, M2, M3, ..., Mn so as to select a relevant failure model Mi with a failure age $T_0$ defining the age that the engine 1 will have at the time of the failure.

Advantageously, the relevant model is selected using a Monte-Carlo simulation on the set of failure models M1, M2, M3, ..., Mn. The Monte-Carlo simulation can determine deterministic outputs from stochastic inputs corresponding to probability distributions of failure models M1, M2, M3, ..., Mn of the Weibull law type. Due to the law of large numbers, the Monte-Carlo simulation can associate a deterministic number of occurrences of an event with a probability of occurrence of this event.

In this case, the probability distribution H(t) for correct operation of a component of the engine 1 may be expressed as a function of the probability of failure (or distribution function) F(t) after a time t by the following expression:

$$H(t) = 1 - F(t) = e^{-\left(\frac{t-\gamma}{\eta}\right)^\beta} \Leftrightarrow 1 - P = e^{-\left(\frac{t}{\eta}\right)^\beta}$$

where P is a random number between 0 and 1 drawn by the Monte-Carlo simulation corresponding to the probability of failure after time t.

Thus, the time t that corresponds to the age of the engine at the time of failure is given by the following formula:

$$t = -\eta \times \ln(1-P)^{1/\beta}$$

The processing means 11 make this calculation for each of the set of failure models M1, M2, M3, . . . , Mn thus generating a set of failure ages $\{t_1, t_2, \ldots, t_n\}$.

The processing means 11 are configured to select a relevant failure age among this set of failure ages and the failure model corresponding to this age. For example, the relevant failure age might correspond to the minimum age $$T_0 = \min_{i=1,\ldots,n} t_i.$$

It should be noted that this relevant failure age $T_0$ can indicate the date of the shop visit.

In step E40, the processing means 11 are configured to associate workscope decision rules R on the engine 1 with the relevant failure model Mi as a function of the set of parameters P1, P2, . . . , Pi relative to this engine 1.

Advantageously, the set of influential parameters comprises engine reconstruction constraints and parameters concerning the age of the engine including the age of the engine at the time of the failure, the technical history (or operating duration) of the engine expressed in hours or operating cycles since its last shop visit, the rank or SV (Shop Visit) index corresponding to the number of shop visits of the engine in the workshop 3, and the potential remaining life for each of a plurality of Life Limited Parts (LLP) of the engine 1.

In step E50, the processing means 11 are configured to determine the workscope (Wf) for required maintenance to be done on the engine 1, as a function of these decision rules R.

Thus, the processing means 11 make the link between the most probable cause of failure (in other words the relevant failure mode) and influential parameters that can include the history of the engine, reconstruction constraints and the rank of its shop visit, so as to plan the most realistic possible workscope at the time of the shop visit indicated by the relevant failure age $T_0$ determined in step E30.

Figure 3:
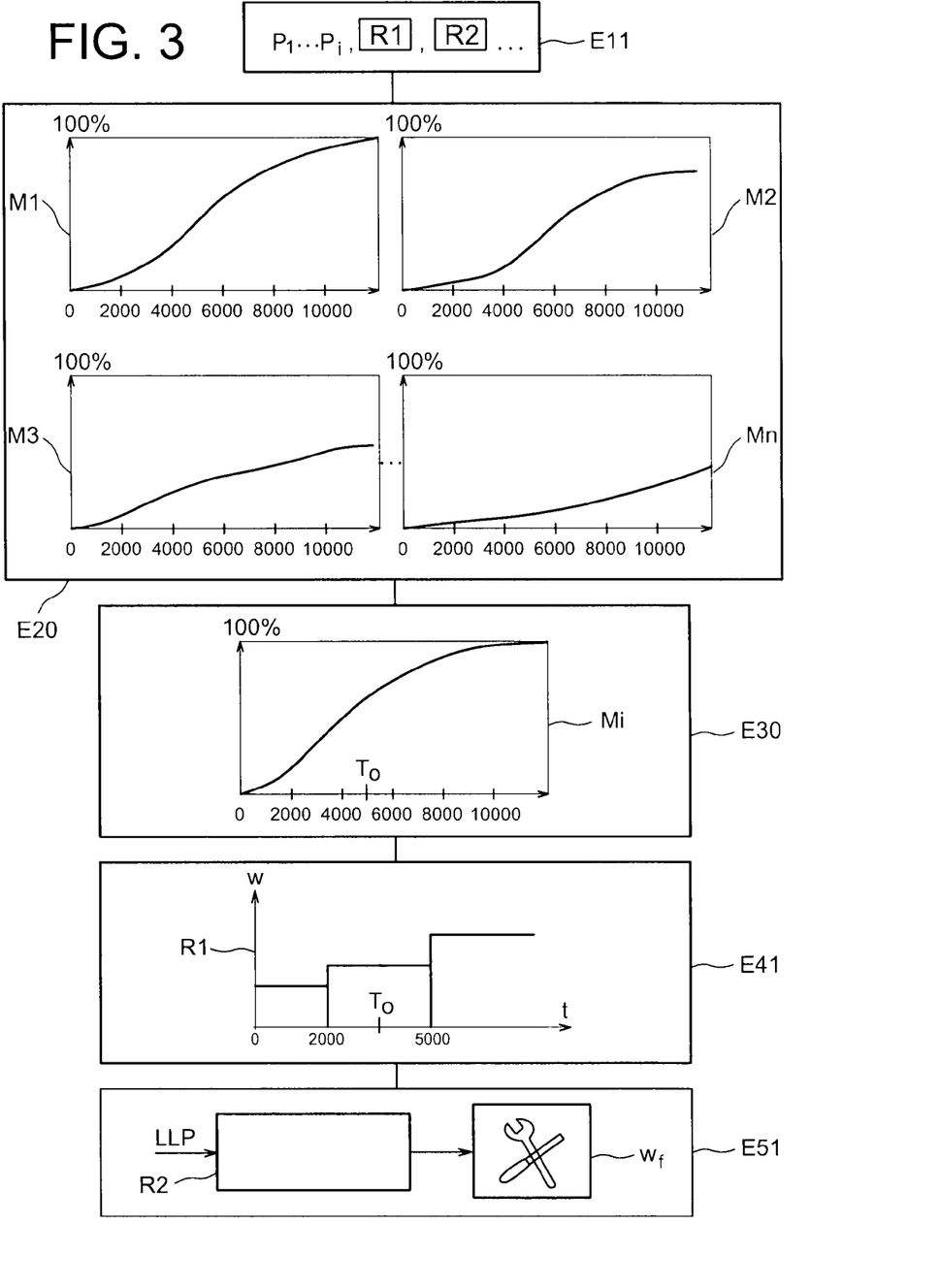
FIG. 3 shows a particular embodiment of the method for predicting maintenance operations in FIG. 2.

FIG. 3 shows a particular embodiment of the maintenance operation prediction method in FIG. 2.

Step E11 relates to initialisation of data, parameters P1, . . . Pi, and input variables as in step E10 in the previous figure. More particularly, according to this example, the set of decision rules R about the workscope on the engine 1 comprises a set of first rules modules R1 and a set of second rules modules R2.

The set of first rules modules R1 is defined such that each of these first modules is associated with a determined failure model and a determined SV rank for the shop visit in the workshop 3.

Figure 4:
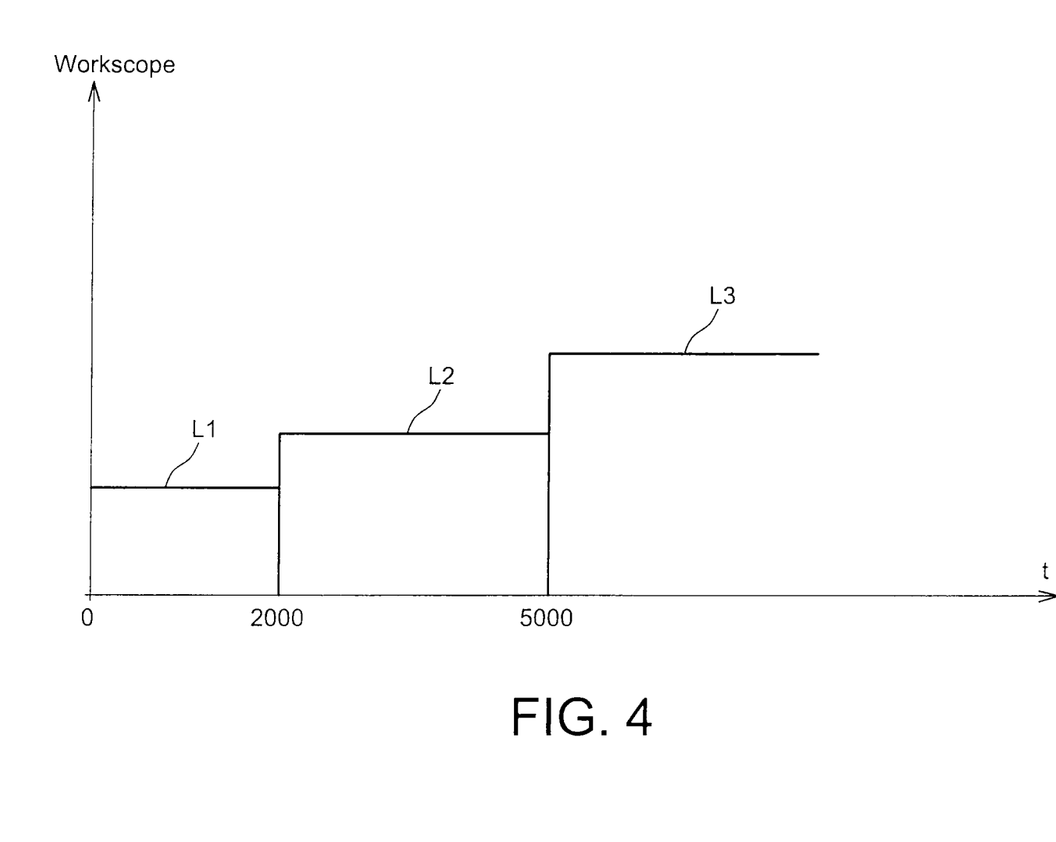
FIG. 4 shows an example of a first rule model defining a plurality of workscopes according to the invention.

FIG. 4 shows an example of a first rules module defining a plurality of levels L1, L2, L3 or workscopes relative to engine operating times. In other words, a first rules module R1 contains "critical underwing times" for selection of the workscope, for the different workscopes. The different workscopes may concern the low pressure compressor LP, the high pressure compressor HP, the combustion chamber, the high pressure turbine THP, the low pressure turbine TBP etc. For example, the exhaust gas temperature (EGT) margin may be regenerated by taking action on the engine core gas generator (in other words the assembly composed of the high pressure compressor HP, the combustion chamber and the high pressure turbine THP).

The example in FIG. 4 shows three levels indicating the nature of the required workscope due to a given failure cause X as a function of the underwing time t of the engine 1. This graph shows a first level L1 called minor SV (shop visit) between 0 and 2000 cycles, a second level L2 called a medium SV between 2000 and 5000 cycles, and a third level L3 called a major SV for an underwing time of more than 5000 cycles. A minor SV level corresponds to a shop visit with a reduced workscope, a medium SV level corresponds to a workscope on the engine core gas generator, and a major SV level corresponds to a workscope covering the engine "core" and the low pressure turbine TBP.

For example, the first rules modules R1 may correspond to tabular data in the form of values separated by commas using files in the csv (comma-separated values) format called "cards". Thus, the card may be structured as follows for the rank 1 shop visit in FIG. 4:

Card date; Levels; cause X; level 1; rank 1; engine model; engine rating (in other words a sub-model of the engine as a function of the thrust output by the engine); 0; 2000; minor sv.

Card date; Levels; cause X; level 2; rank 1; engine model; engine rating; 2000; 5000; medium sv.

Card date; Levels; cause X; level 3; rank 1; engine model; engine rating; 5000; 50000; major sv.

The lower and upper limits of each level L1, L2, L3 are defined for each engine type relative to its environment. Advantageously, these limits are modified or adjusted as a function of operating experience on workscopes done in the workshop 3.

Furthermore, all second rules modules R2 define the final workscope as a function of engine 1 reconstruction constraints, for each level L1, L2, L3 of the first modules R1. In other words, for each first rules module R1 there is a second rules module R2 defining relations between the workscopes of the first rules module and the final maintenance operations. The second rules modules R2 may also be created using files or cards in the csv format.

Steps E20 and E30 in FIG. 3 are similar to the steps described with reference to FIG. 2.

Thus in step E20, the processing means 11 have a set of failure models M1, M2, M3, . . . , Mn adapted to the engine 1.

For example, there is a first failure model M1 concerning a cause of failure related to the exhaust gas temperature EGT, a second failure model M2 concerning a cause of failure on the Core, a third failure model M3 concerning a cause of failure on the TBP, and an $n^{th}$ failure model Mn concerning a cause of failure on the fan.

Then in step E30, the processing means 11 compare with each other the set of failure models M1, M2, M3, . . . , Mn adapted to the engine 1 to select a relevant failure model Mi with the age $T_0$ that the engine 1 will have at the time of the failure.

Referring to the previous example, assume that the relevant model Mi is the first failure model M1 for the EGT at 18 kcycles that was selected after comparing failure models M1, M2, M3, . . . , Mn and an initial LLP potential of 20 kcycles on the second failure model M2 for the Core, 25 kcycles on the third failure model M3 for the TBP, and 30 kcycles on the $n^{th}$ failure model Mn for the Fan.

In steps E41 and E42, the processing means 11 are configured to associate decision rules incorporating the first and second rules modules as a function of the set of parameters P1, ..., Pi relative to the engine, with the relevant failure model Mi.

More particularly in step E41, the processing means 11 associate a first rules module R1 defining a plurality of workscopes L1, L2, L3 relative to operating times of the engine 1, with the relevant failure model Mi.

Then, the processing means 11 select a relevant level among the plurality of workscopes L1, L2, L3 as a function of the failure age $T_0$ associated with the relevant failure model Mi selected in step E30. This first rules module R1 can provide a minimum workscope of maintenance operations.

In the case of the previous example, the relevant failure model M1 concerning the EGT failure at 18 kcycles is in the second level L2 of the first rules module R1 associated with a medium SV for minimum work on the "Core".

In step E42, the processing means 11 select the second rules module R2 defining relations between workscopes L1, L2, L3 of the first rules module R1 associated with the relevant failure model Mi and the corresponding maintenance operations.

The second rules module R2 enables the processing means 11 to determine the required maintenance workscope as a function of the relevant level L2 selected in step E41, engine reconstruction constraints and potential remaining life for each life limited part LLP of the engine 1.

For example, the card for the second rules module R2 for cause X and the shop visit rank 1 may be structured as follows:

Cause X number; Cause X; level 1; LLP need (yes/no); Fan LLP need (yes/no); Core LLP need (yes/no); TBP LLP need (yes/no); final workscope code; combined workscope (yes/no); final workscope.

In the example described above, let us assume that the reconstruction constraints of the engine 1 are 8 kcycles on LLPs during the shop visit. In other words, the engine 1 must be rebuilt so that it is in good condition for at least 8000 cycles after it leaves the shop. Assume that the remaining potentials are 2000 cycles on the Core, 7000 cycles on the TBP and 12000 cycles on the Fan. Therefore, Core LLPs and TBP LLPs will have to be replaced so that all LLPs will have a potential of more than 8000 cycles. Therefore, Core and TBP LLPs are necessary which increases the initial Core workscope to Core+TBP.

Thus, due to these first and second decision modules, the processing means 11 determine the required maintenance workscope Wf (final workscope) to be done on the engine 1 during the shop visit in the workshop 3 given by the previously determined relevant failure age $T_0$.

Advantageously, the set of parameters will be modified after the maintenance operation on the current engine has been completed. This makes it possible to take account of the results of this workscope to determine the next workscope more accurately.

It should be noted that when forecasting an optimum maintenance operation, it is advantageous to take account of all the following parameters: failure age, rank of shop visit, potential remaining life for each life limited part LLP of the engine, and engine reconstruction constraints. Obviously, the method according to this invention will operate equally well with more parameters or with only some of these parameters. For example, the parameter corresponding to the rank of the shop visit could be ignored.

The invention claimed is:

1. A method for predicting maintenance operations on a current aircraft engine, comprising:
    determining, using a processor and a simulation on a set of failure models associated with the current aircraft engine, a failure age corresponding to an age of the current engine at a time of failure, for each failure model of the set of failure models, each said failure model corresponding to a given failure and being represented by a law for the cumulated probability of failure as a function of time expressed in terms of flight cycles;
    selecting, using the processor, a relevant failure model by selecting one of said failure models of said set of failure models, the relevant failure model having a minimum failure age;
    determining, using the processor, a relevant first rules module corresponding to the relevant failure model, the relevant first rules module defining a plurality of workscopes as a function of the age of the current aircraft engine expressed in terms of flight cycles;
    from the plurality of workscopes of the relevant first rules module, selecting, using the processor, a relevant minimum workscope associated with the minimum failure age; and
    determining, using the processor, a required final maintenance workscope to be done on the current aircraft engine from the relevant minimum workscope and from a required number of flight cycles before a next maintenance operation.

2. The method according to claim 1, wherein said determining the failure age is based on input of a set of parameters, the set of parameters including the following parameters: failure age, operating duration of the current engine since a last shop visit, rank of a shop visit, potential remaining life for each of a plurality of life limited parts (LLP) of the current engine, and reconstruction constraints of the current engine.

3. The method according to claim 2, wherein said set of parameters is modified after a maintenance operation on the current aircraft engine has been done.

4. The method according to claim 1, wherein said first rules module is selected from among a set of first rules modules defined previously during an initialization phase, each of said first rules modules being associated with a determined failure model and a determined rank of a shop visit.

5. The method according to claim 1, wherein said failure models are derived from analysis of operating experience on a fleet of engines including data regarding a number of engines, an operating environment of each engine, a model of each engine, an operational condition of each engine, a maintenance location of each engine, and a duration between entry of each engine in a workshop and its exit from the workshop.

6. The method according to claim 1, wherein the minimum failure age defines a predicted age of the current aircraft engine at the time of failure.

7. The method according to claim 1, wherein the minimum failure age indicates a date of a shop visit, and said determining the required final maintenance workscope indicates a workscope to be performed at the date of the shop visit.

8. The method according to claim 1, wherein said selecting the relevant failure model includes selecting the relevant failure model having the minimum failure age from among a set of failure ages corresponding to said set of failure models.

9. The method according to claim 1, wherein each said failure model of the set of failure models corresponds to a different cause of failure for the current aircraft engine.

10. A system for predicting maintenance operations on a current aircraft engine, comprising:
processing circuitry configured to
determine, using a simulation on a set of failure models associated with the current aircraft engine, a failure age corresponding to an age of the current engine at a time of failure, for each failure model of the set of failure models, each said failure module corresponding to a given failure and being represented by a law for the cumulated probability of failure as a function of time expressed in terms of flight cycles;
select a relevant failure model by selecting one of said failure models of said set of failure models, the relevant failure model having a minimum failure age;
determine a relevant first rules module corresponding to the relevant failure model, the relevant first rules module defining a plurality of workscopes as a function of the age of the current aircraft engine expressed in terms of flight cycles;
from the plurality of workscopes of the relevant first rules module, select a relevant minimum workscope associated with the minimum failure age; and
determine a required final maintenance workscope to be done on the current aircraft engine from the relevant minimum workscope and from a required number of flight cycles before a next maintenance operation.

11. A non-transitory computer-readable storage medium storing computer-readable instructions that, when executed by a computer, cause the computer to perform a method comprising:
determining, using a simulation on a set of failure models associated with the current aircraft engine, a failure age corresponding to an age of the current engine at a time of failure, for each failure model of the set of failure models, each said failure module corresponding to a given failure and being represented by a law for the cumulated probability of failure as a function of time expressed in terms of flight cycles;
selecting a relevant failure model by selecting one of said failure models of said set of failure models, the relevant failure model having a minimum failure age;
determining a relevant first rules module corresponding to the relevant failure model, the relevant first rules module defining a plurality of workscopes as a function of the age of the current aircraft engine expressed in terms of flight cycles;
from the plurality of workscopes of the relevant first rules module, selecting a relevant minimum workscope associated with the minimum failure age; and
determining a required final maintenance workscope to be done on the current aircraft engine from the relevant minimum workscope and from a required number of flight cycles before a next maintenance operation.

* * * * *